United States Patent
San Lorenzo et al.

(10) Patent No.: US 7,507,343 B2
(45) Date of Patent: Mar. 24, 2009

(54) MIXING AND SETTLING METHOD AND DEVICE IN SOLVENT EXTRACTION PROCESSES TO RECOVER HIGH-PURITY PRODUCTS

(75) Inventors: Daniel Martin San Lorenzo, Madrid (ES); Gustavo Diaz Nogueira, Madrid (ES); Maria Frades Tapia, Madrid (ES)

(73) Assignee: Tecnicas Reunidas S.A., Madrid (ES)

( * ) Notice: Subject to any disclaimer, the term of this patent is extended or adjusted under 35 U.S.C. 154(b) by 660 days.

(21) Appl. No.: 11/137,308

(22) Filed: May 25, 2005

(65) Prior Publication Data

US 2005/0218072 A1 Oct. 6, 2005

(51) Int. Cl.
*B01D 11/00* (2006.01)

(52) U.S. Cl. .................. 210/634; 210/511; 210/521; 210/804; 366/263; 366/290; 366/348; 422/258; 422/259

(58) Field of Classification Search ............ 210/511, 210/513, 519–522, 634, 639, 804; 366/262, 366/270, 325.4, 330.1, 343, 279, 290, 291, 366/155.1, 155.2, 263–265, 348; 422/258, 422/259
See application file for complete search history.

(56) References Cited

U.S. PATENT DOCUMENTS

| | | | | |
|---|---|---|---|---|
| 2,137,966 A | * | 11/1938 | Rankin | 210/201 |
| 2,266,097 A | * | 12/1941 | Tolman | 366/290 |
| 2,937,078 A | * | 5/1960 | Parish et al. | 422/257 |
| 3,984,331 A | | 10/1976 | Paige | |
| 4,511,541 A | | 4/1985 | Bierman et al. | |
| 4,551,314 A | | 11/1985 | Beckstead et al. | |
| 4,559,203 A | | 12/1985 | Bauer et al. | |
| 4,572,771 A | | 2/1986 | Duyvesteyn et al. | |
| 4,721,571 A | | 1/1988 | Nyman et al. | |
| 4,925,441 A | | 5/1990 | Jubin | |
| 5,185,081 A | | 2/1993 | Nyman et al. | |
| 5,511,881 A | | 4/1996 | Post et al. | |
| 5,662,871 A | * | 9/1997 | Nyman et al. | 422/259 |
| 6,007,237 A | | 12/1999 | Latto | |
| 6,033,575 A | | 3/2000 | Perret et al. | |
| 6,083,400 A | | 7/2000 | Nyman et al. | |
| 6,132,615 A | | 10/2000 | Nyman et al. | |
| 6,176,608 B1 | | 1/2001 | Nyman et al. | |

FOREIGN PATENT DOCUMENTS

| | | |
|---|---|---|
| CA | 1198290 | 12/1985 |
| EP | 0 154 448 | 9/1985 |

(Continued)

*Primary Examiner*—Joseph W Drodge
(74) *Attorney, Agent, or Firm*—John C. McMahon (57) ABSTRACT

The device of the invention includes the following 5 new elements in each mixer-settler: a) agitators with blunt edged turbines, b) decreasing degree of agitation throughout the series of mixing compartments, c) baffle with a central window in the settler interface, located after the flow buffers, and d) baffle without a window, centered in the settler interface, located after the baffle with a window. These elements allow for an operative method which inhibits secondary dispersion, reducing the formation of micro-droplets, without affecting the mass transfer between the phases. Consequently, this obtains a phase separation process with entrainments so small that it is possible to drastically increase the quality of the product, by obtaining an ultra-pure aqueous extract, simultaneously reducing the settling surface required.

17 Claims, 5 Drawing Sheets

FOREIGN PATENT DOCUMENTS

| | | |
|---|---|---|
| EP | 0 156 735 | 10/1985 |
| ES | 2 134 725 | 10/1999 |
| GB | 2021965 | 12/1979 |
| WO | WO 01/44520 | 6/2001 |
| WO | WO 02/066708 | 8/2002 |

* cited by examiner

MIXING AND SETTLING METHOD AND DEVICE IN SOLVENT EXTRACTION PROCESSES TO RECOVER HIGH-PURITY PRODUCTS

OBJECT AND FIELD OF APPLICATION

This invention refers to a method and device perfecting the purification system used in extraction processes using organic solvents (hereinafter, SX) by means of mixers-settlers, as used for the recovery of metals and other products. The invention includes new elements both with regards to equipment and operative methodology.

Its field of application is the final or intermediate production of any high-purity product, preferably metals and their salts, requiring SX technology with mixers-settlers, in which phases are mixed by stirring turbines and/or pumping in one or several mixing units, reactors or tandem compartments (hereinafter, compartments).

STATE OF THE ART

SX is a well-known separation technique, in which an impure aqueous solution containing the end product, ion or species (hereinafter, species) comes into contact with an organic solvent showing a special affinity with said species. After the complete mixing of the two phases, and once the matter has been transferred, it is separated for extraction of the end product.

The equipment typically used in this type of process consists of mixers and settlers. Each mixer-settler is called a "stage" in SX. The mixer, which may have several tandem compartments, has the function of dispersing the two phases to be mixed, to form an emulsion in order to favour transfer and obtain equilibrium. The settler must be capable of re-separating the two components, organic phase and aqueous phase, forming the emulsion. The most important parameters defining the operation are:

In the mixer, stirring intensity is largely determined by viscosity, surface tension and density differences between the phases. It is essential to identify the stirring intensity required, since too little leads to the formation of large droplets reducing the contact area and transfer, whereas too much causes the formation of stable emulsions and small droplets which are easily entrained by the other phase, with a negative impact on the purity of the end product obtained. Furthermore, is rotating stirring equipment is used, energy is concentrated on the borders, leading to a non-uniform droplet-size distribution.

In the settler, the separation conditions depend both on the physical characteristics of the dispersed phases (differences of density, surface tension, viscosity, temperature, acidity, unitary speed) and on the intensity of the mix and the resulting droplet size.

When the two liquid phases—organic and aqueous—involved in a metal or other product extraction process with organic solvents are mixed, it is not only important to ensure appropriate stirring, to provide a good contact for the mass transfer of the metal or species to be extracted from one phase to the other (chemical transformation), but for this mix to be such that after the reaction it is not difficult to separate the phases in the settler (physical transformation).

The specific design of this equipment, their combination with other standard agitators, and their distribution in several compartments of an extraction stage, allow for appropriate effects (both chemical and physical) and constitute a clear improvement allowing for a faster and clearer phase separation while maintaining all its chemical advantages. This clarity in the separation of non-miscible phases produces less entrainments of one phase in the other, leading to greater efficacy in the separation of the possible impurities contained in one of the feed phases.

The agitator in the first compartment of a stage mixer in an SX process normally has a two-fold function consisting of stirring and pumping the phases from the settlers in the adjacent stages, so its geometry is usually similar to that of a pump impeller. The degree of agitation and pumping capacity largely depend on the size of the turbine, its stirring speed and its geometry. Normally, the organic and aqueous phases involved in the metal transfer reaction are easily and rapidly mixed with the thorough mixing of one phase with the other. One type of radial agitation, appropriate for both functions, gives the agitator a shear effect, especially on the borders of the turbine, and the greater the degree of this shear effect and agitation, the smaller are the droplets formed (and therefore the more difficult to decant).

The agitators in following mixer compartments have the function of maintaining the homogeneity, to provide time for the reaction according to the specific kinetics of each type of extraction and each phase involved. They can therefore be of the axial agitation (non-shear) type, with less agitation (size and/or speed).

It is known that the conditions in which the mix is agitated affect its decantation later. Depending on the conditions, if the type of mix is such that there are organic phase droplets dispersed in the aqueous phase (aqueous continuous, hereinafter AC) or aqueous phase droplets in the organic phase (organic continuous, hereinafter OC), this causes one phase or the other to be cleaner (less entrainment). The organic/aqueous phase ratio of the mix is another variable which not only affects the type of prior mix but also creates a degree within each type of mix which either improves or hinders phase decantation. It has been shown that there are possibilities of improving the characteristics and operative conditions of the agitation process which lead, in specific equipment, to an improvement in decantation, reducing the entrainments from one phase into another and, consequently, the impurities entrained.

The mix obtained in SX mixers is fed into settlers where the phases are separated by gravity, thanks to the different density of each phase. This liquid-liquid separation is a dynamic process in which, since it is continuous, the speed and type of route of each phase affects the ease with which the resulting emulsion is broken, the surface area available and consequently the time of residence, temperature, acidity, etc.

For a specific process, settler conditions and geometry, the unitary speed of each phase may vary with the feed flow, including its possible recirculation and control of the position of the interface. The ease with which the emulsion can be broken, for a given liquid temperature and characteristics, is not only affected by unitary speed but also be the type and degree of agitation obtained and the type of "internal elements", which are especially designed barriers introduced in the flow to facilitate its distribution, homogenisation and lamination throughout the settler's geometry, or to facilitate an increase in the size of the droplets, therefore improving the decantation process.

The purpose of said "internal elements" is therefore to favour the decantation of the emulsion, preventing each phase from overflowing, obtaining them separately and preventing one phase from being contaminated with the other.

Three stages are normally used in SX technology: extraction of the product or its species by an organic phase from an impure aqueous solution, washing to purify this organic phase and, finally, re-extraction of the purified species or product to a new aqueous phase. In each of these stages, there can be several mixers-settlers (stages) in serial formation, in which each phase (organic or aqueous) circulated against the current.

In SX technology, the need to obtain a high-purity product is not only derived from market conditions or quality-based competition, but it is often an essential technical condition to obtain this product at later stages (such as zinc electrolysis). The current problem is that obtaining high purity levels requires a process with the simultaneous combination, within SX, of a selective solvent, of mixers-settlers with a design and internal elements that provide an appropriate mix and good phase separation, and acceptable operative conditions.

There are several processes and systems which reinforce the product purification aspect based on increasing or decreasing the number of mixers-settlers (stages) or the flow conditions applicable during a stage (washing, for example), or on chemical aspects such as enhancing the selectivity of the species to be extracted or its purification after extraction, etc., but not on the internal components of each mixer or settler or special operative conditions that could drastically reduce the aspects preventing the production of pure solutions containing the target species such as, for instance, the entrainments (suspended droplets) of one phase in the other or emulsions from the two phases.

In the former case, documents such as Spanish patent applications PCT ES01/00060 and ES00/0458 or U.S. Pat. Nos. 4,552,629 and 4,572,771, applied to zinc SX, describe either a process especially based on reinforcing the chemical aspects of purification and selectivity (the first two presented by this applicant) or varying the aqueous medium (sulphuric and hydrochloric solutions) and the extractant system (the third), or processes based on specific purification processes applied before (oxidation with chlorine and settling) or after (use of additional membranes or diaphragms in the electrolysis) the SX (the fourth). The same occurs in processes where the selectivity of the extraction is enhanced by selecting specific organic solvents, such as the recovery of zirconium and hafnium (EP 154.448), gallium (U.S. Pat. No. 4,559,203), separation of rare-earth elements (EP 156,735), cadmium (U.S. Pat. No. 4,511,541), separation of nickel and cobalt, copper SX, etc. or others processing specific materials for specific applications such as Spanish patent ES 9701296 (household batteries) and Canadian patent CA 1198290 (secondary zinc products), presented by this applicant. None of them contemplates either the introduction of special elements in the equipment to be used or non-generic conventional mixing and decantation conditions enhancing purification.

Within the second group, more in line with this invention, involving equipment, methods and apparatus other than conventional mixers-settlers, there are patents referring to the mixer and/or its agitation turbine, to the settler, or to the two together.

One group of them (Outokumpu, Finland) covers different methods and apparatus acting on the mixing and decantation of phases, but largely on the hydrodynamic aspects of the system, proposing special flow chambers or phase recycling, or with turbine designs focused on preventing aeration, or forcing a change of direction in the mix flow, etc. Thus, U.S. Pat. No. 4,721,571 defends a mixer-presettler-settler method in which the presettler acts as an intermediate chamber enhancing phase separation with its corresponding flow buffers. U.S. Pat. No. 5,185,081 describes a method of mixing and separating phases with spiral turbines and a system aimed at preventing and avoiding aeration as the principal source of emulsion. Another method and apparatus for re-circulating part of the decanted heavy phase from the interface area to the mixer is described in U.S. Pat. No. 6,083,400 as a design improvement for better phase contact and droplet size in the mixer. Another patent, which complements the previous one, is U.S. Pat. No. 6,132,615, defending a method and apparatus to improve phase separation by the advanced design of the flow buffers, improving the conventional system's hydrodynamics. U.S. Pat. No. 6,176,608 acts on the decantability of the phase mix discharge system, subjecting it to several changes of direction before discharge into the settler.

Another group of patents, such as U.S. Pat. No. 4,925,441 (US Energy, USA) contemplates a cascade of centrifuge contactors with intercommunications for phase mixing and separation, applicable to re-processing nuclear fuel. U.S. Pat. No. 6,007,237 (Bateman, Canada) defends the action of a mix based on controlling agitation by the creation and propagation of vortex rings with a special agitator. U.S. Pat. No. 4,551,314 (Amax, USA) covers a mixing system based on two tandem compartments, with different continuity conditions in the phase as an element favouring decantation. Likewise, U.S. Pat. No. 6,033,575 (Krebs, France) proposed a pre-separation of the dispersion in two independently decanted fractions.

For each system and reagents used, most of the agitation turbines used principally in copper SX (Lightnin, VSF by Outokumpu, Nettco, Philadelphia, Krebs, etc.) conceive the pump turbine like a pump impeller and, to reduce power consumption, they usually have curved or fast, small diameter blades which, in order to reduce pumping consumption, sacrifices the agitation effect, with tiny droplets of one phase forming in the other due to the high shear effect on the straight edges of the turbine, this making phase separation very difficult. Another group of turbines or systems (Baterman, Outokumpu spiral, etc.), on the other hand, have a very gentle type of agitation, insufficient for appropriate pumping or agitation and requiring additional agitators or systems.

With regards to the decantation systems used in the settler, and as we have mentioned earlier, there are usually variations on the design of the flow distributors and buffers, or hydrodynamic variations affecting re-circulation to the mixer with the corresponding increase in the flow to be decanted, or variations in the change of direction of the mix prior to discharge into the settler.

This invention affects these last aspects: new designs, new internal elements and specific conditions. The purpose of this invention is to obtain a drastic reduction in the entrainments of one phase in the other by reducing, depending on the phase, contamination of the organic phase with entrainments from the impure aqueous phase (aqueous entrainment in organic phase) or entrainments from the organic phase in the purified aqueous phase (organic entrainment in aqueous phase).

BRIEF DESCRIPTION OF THE INVENTION

The proposed invention acts directly on one of the principal causes of impurity: entrainments from one phase in the other. This is reduced by acting both on the agitation system that provokes the emulsion created in the mixer and on the destruction of its consistency which persists along the dispersion band in the interface (settler). Thus, in the mixer, a reduction in the quantity and consistency of the emulsion is obtained by jointly acting on the special design of the primary pump agitator (first compartment) and on its treatment due to the way of reducing this consistency throughout the rest of the compartments and, later, on the dispersion band in the settler with the introduction of systems and apparatus to reduce the quantity and persistence of the band. These aspects are not approached in any of the aforementioned documents.

Both in the mixers and the settlers, we add a series of especially designed elements. In each mixer compartment, we install turbines with blunt edged blades, eliminating points and sharp edges, to avoid a type of shear mix which produces agitation with excessively small droplets. This, together with an appropriate combination of the mixing and overflow operative conditions throughout the series of compartments, obtains an easily decanted emulsion. As an additional solution, we recommend a compartment geometry in which they are communicated and connected by wide communication channels which do not provoke additional agitation and favour droplet groups in each phase. Agitation should also be of a type to reduce the level of occasional turbulences. Although it is also possible to employ cylindrical mixing units or compartments, the use of square compartments in the mixers, connected by communication channels between contiguous compartments and superficial counter currents to avoid vortices, also has a positive impact.

In the conventionally designed settler, we introduce two new "internal elements" located cross-wise to the flow after the flow buffers and in the interface area:

A first baffle located in the interface area, of a size such as to allow for the upper and lower overflow of part of each decanted non-emulsified phase, by allowing the compressed evacuation of this emulsion towards the centre of the interface.

A second baffle, later in the direction of the flow and similar to the first, but without a window (blind), retaining all the remaining emulsion and decanted areas, allowing the overflow phases to later maintain a clearly defined and clear interface line.

Their position in the settler varies depending on the mixer-settler considered, in order to ensure the best possible conditions.

On the other hand, the operative conditions in the organic and aqueous phase mix and decantation affect the type of mix formed and the degree of difficulty involved in its eventual separation.

In the mixing process, a decreasing sequence of the degree of agitation in which it progressively decreases in the mixer's series of compartments, has advantages over decantation. More intense agitation produces smaller droplets which are more difficult to separate, and consequently more entrainment of one phase in the other, making the product impure.

It has been shown that, following general lines, the achievements obtained with regards to later physical behaviour (speed, clear decantation and less entrainments) are clearly positive starting with a degree of agitation in the first compartment in the series which is appropriate for pumping purposes, and then reducing this degree in the following compartments. This is complemented by making the mix overflow from each compartment in the series fall through wide channels forcing a change of direction in the mix.

The mix thus obtained overflows into the settler from the last compartment of the mixer through a communication channel. The two phases are separated in the settler by means of a physical process in which the period of decantation until the emulsion becomes clear separated phases will depend, besides the specific operative conditions for each SX system selected (different density, temperature, type of mix, etc.), on the appropriate selection of unitary velocities for each phase and certain operative conditions which speed up the process. These conditions are not necessarily the same in all SX systems or in all settlers. The emulsion is broken due to the collision and intersection of the disperse droplets, which break and grow in size when they move to rise or top, according to the relative density of each phase. More unitary velocity could cause more contacts, but not many because no turbulence is generated, whereas there would also be much less time for decantation, running the risk of overflow before this process is completed.

Therefore, the process applied both to the mixing and phase separation devices is summarised as:

a) Mixing:

Special agitation-pump turbine

Appropriate combination of types of turbine in the different mixing compartments of a stage Mixer geometry b) Settling:

Use of specific internal accessories

Appropriate combination and distribution of these accessories

The appropriate selection of the operative conditions of the devices completes the efficacy of the proposed method, affecting:

a) Mixing:

Type and degree of agitation in each mixer

Their combination in the series of agitators in the compartments

Specific operative conditions in mixers b) Settling:

Decantation velocity design, appropriate and different for each phase and each stage.

Specific operative conditions in settlers.

This improves the quality of the separations, decreasing the sedimentation surface required and, consequently, enhancing the quality of the end product obtained.

BRIEF DESCRIPTION OF THE DRAWINGS

To complete the previous description, and in order to provide a better understanding of the characteristics of the invention, following is a detailed description of a preferred embodiment, based on a set of drawings which is attached to this description and where, in an illustrative and non-restricted way, the following has been represented.

In these figures, the numerical references correspond to the following parts and elements:

| | |
|---|---|
| 1 | Extraction stage |
| 2 | Wash stage |
| 3 | Re-extraction stage |
| 4 | Mixer, consisting of a series of several compartments |
| 5 | Settler |
| 6 | Organic phase interconnection |
| 7 | Impure solution (fertile liquid) feed |
| 8 | Residual (refined) impure solution |
| 9 | Aqueous phase feed to wash stage |
| 10 | Aqueous phase feed to re-extraction stage |
| 11 | Purified aqueous solution with product species (aqueous extract) |
| 12 | Primary agitator |
| 13 | Secondary radial agitator |
| 14 | Secondary axial agitator |
| 15 | Communication channels between mixer compartments |
| 15' | Communication channel upper overflow |
| 15" | Communication channel lower overflow |
| 16 | Turbine blades |
| 17 | Blunt edges on plates |
| 18 | Blunt edges on blades |
| 19 | Flow distributor |
| 20 | Flow buffer |
| 21 | Baffle with window |
| 22 | Window |
| 23 | Baffle without window |
| 24 | Emulsion |
| 25 | Upper overflow collection channel for the decanted organic phase |
| 26 | Lower overflow collection channel for the decanted aqueous phase |
| 27 | Final interface |
| 28 | Interface level control valve system |
| 29 | Recirculation system |
| 30 | Organic phase |
| 31 | Aqueous phase |

DETAILED DESCRIPTION OF A PREFERRED EMBODIMENT

Figure 1:
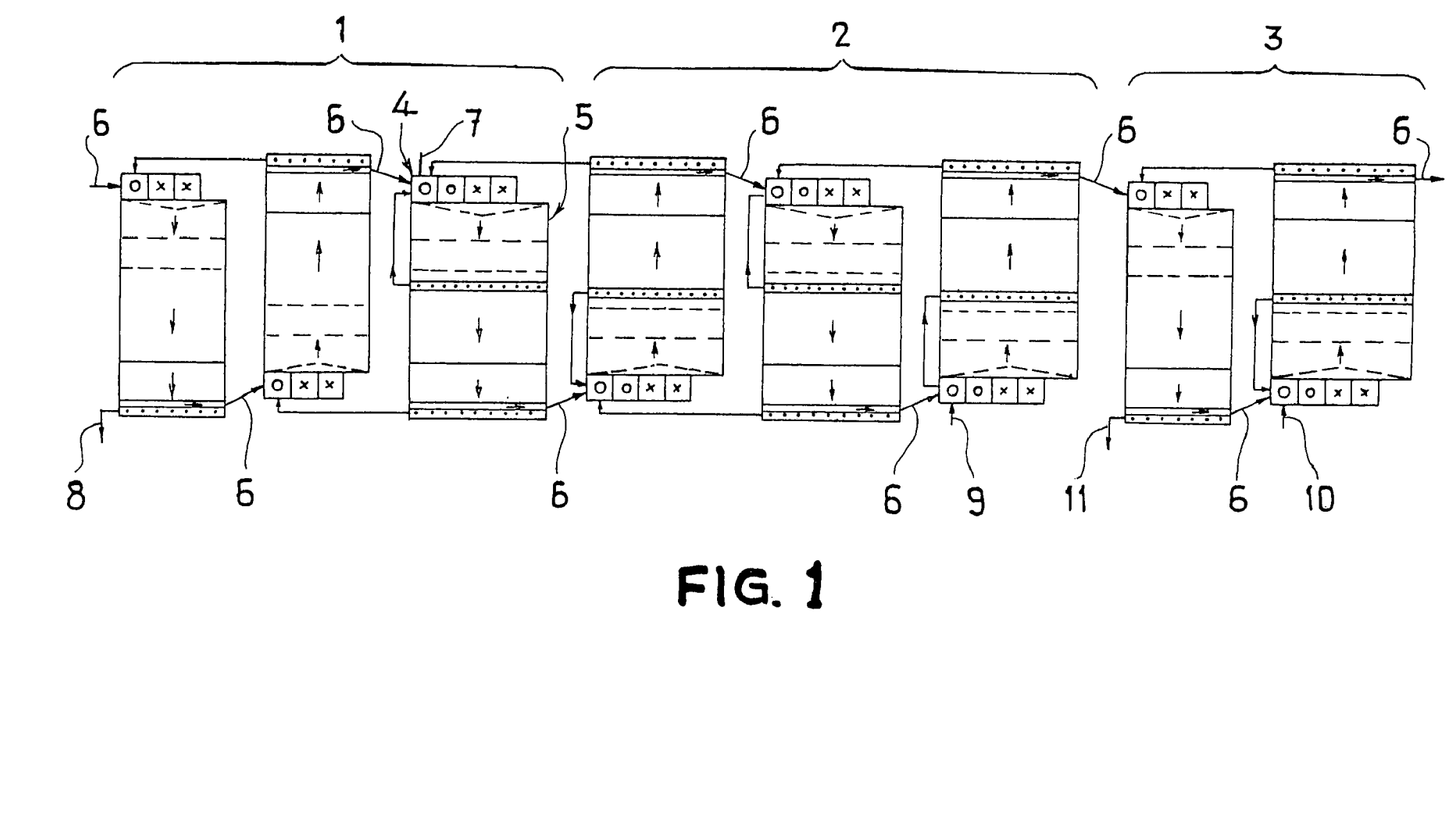
FIG. 1 shows a diagram of an SX installation which, in this case, shows eight stages or mixers-settlers, grouped into three typical stages of this type of installation: extraction, wash and re-extraction, with their interconnection and flows.

FIG. 1 shows an installation to obtain a high-purity product by means of SX technology, consisting of three fundamental stages: extraction stage (1), wash stage (2) and re-extraction stage (3), each formed by a series of several mixers (4)-settlers (5). In this installation, the series of mixers-settlers are connected by organic phase (3) interconnections (6) circulating and loading with the target product in the extraction stage (1), being washed in the wash stage (2) and unloading in the re-extraction stage (3). The different aqueous phases fed to each stage flow in the opposite direction to the organic phase: an impure solution (7) (fertile liquid) containing the product of interest, which is extracted by the organic phase (30), leaving a residual impure solution (8) (refined); an aqueous phase to wash (10) which washes this loaded organic phase, and an aqueous phase to re-extraction (10), recovering the purified product from this organic phase (30) to obtain a purified aqueous solution (11) (aqueous extract).

Figure 2:
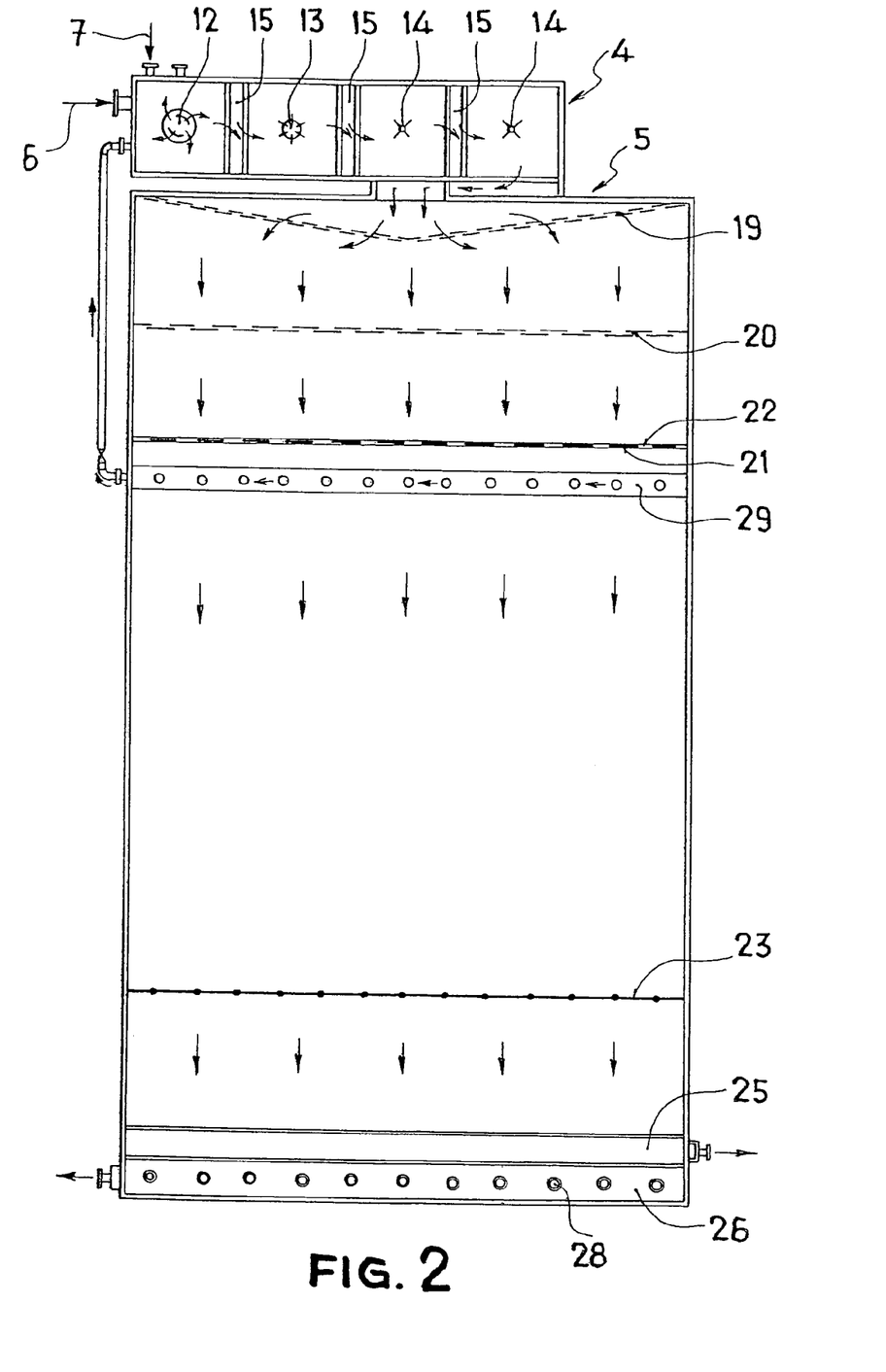
FIG. 2 shows a diagram of one of the mixers-settlers from FIG. 1. In this case, it is a mixer formed by four parallelopipedic tandem compartments, and a settler with details referring both to the position and shape of the traditional elements (distributor, flow buffers, recirculation system, and organic and aqueous phase overflows) and of new elements (baffle with and without window).

FIG. 2 shows a diagram of this mixer (4)-settler (5) in which, in this case, the mix of the organic phase (30) with the aqueous phases (31) and recirculation system (29) takes place in a mixer (4) consisting of a series of 4 compartments equipped with their respective primary agitators (12), secondary radial agitators (13) and secondary axial agitators (14), plus successive communication channels (15) consisting of successive mixer (4) compartments, with the fluid penetrating the communication channels (15) over an upper overflow (15') located on the output side of the previous compartment, and beneath a lower overflow (15") located on the input side of the following compartment, which channels the mixture of the two phases from each compartment to the next independently. The secondary agitators (13) and (14) have turbines which keep the mixture agitated in the desired conditions for an appropriate material transfer and for the eventual separation process. The primary agitator (12) turbine not only agitates, but also acts as a pump, aspiring each phase from the contiguous settlers and, if required, re-circulation from the settler itself. The secondary agitator (13) and (14) turbines keep the phases mixed to complete this unit's function, with the possibility of varying mixing conditions for a better separation process. The agitation conditions have to progressively decrease in the series of compartments with a view to, keeping the two phases agitated, reduce its intensity and aggressiveness, thus preparing the emulsion to facilitate settling and the grouping together of the smaller droplets. In this respect, these compartments can be intercommunicated with wide overflows (15) to facilitate the gradual reduction of the degree of agitation. The settler (5) has both conventional flow distributor (19) systems, flow buffers (20), upper overflow collection channel for the decanted organic phase (25), lower overflow collection channel for the decanted aqueous phase (26), re-circulation system (29), interface level control valve system (28) and new elements consisting of a baffle with (21) and without a window (23).

Figures 3, 4:
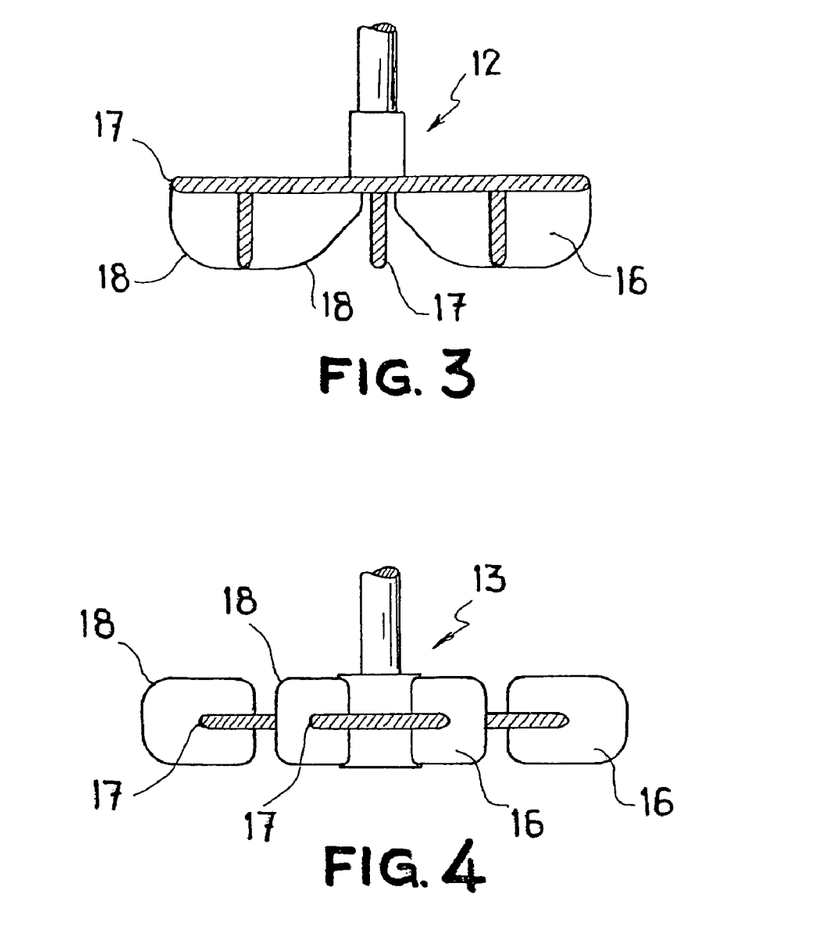
FIG. 3 shows a cross-section diagram of a primary agitator.
FIG. 4 shows a cross-section diagram of a secondary radial agitator.
Figure 5:
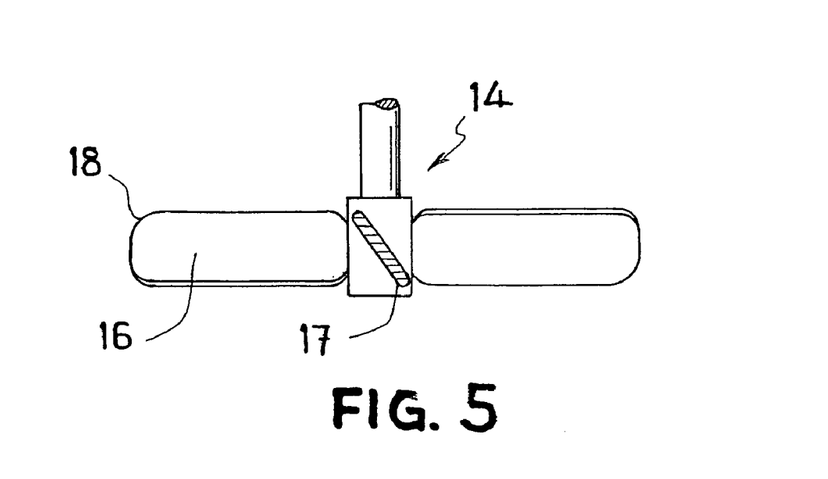
FIG. 5 shows a cross-section diagram of a secondary axial agitator.

The type of mixture with a view to eventual phase separation is improved on the one hand by avoiding or reducing the shear rate and the formation of excessively small droplets by the use of appropriate turbines and, on the other, by progressively reducing the degree of agitation throughout the series of agitators in each mixer-settler. As FIGS. 3, 4 and 5 show, both the primary agitator (12) and the secondary agitators (13) and (14) are equipped with blunt edges on the blades (18) and blunt edges on the plates (17), and this is irrespective of the number and arrangement of the blades (16). These turbines avoid an excessive shear rate during agitation, inhibiting the secondary dispersion responsible for the formation of small droplets created from the large droplets originally produced during primary dispersion.

Figure 6:
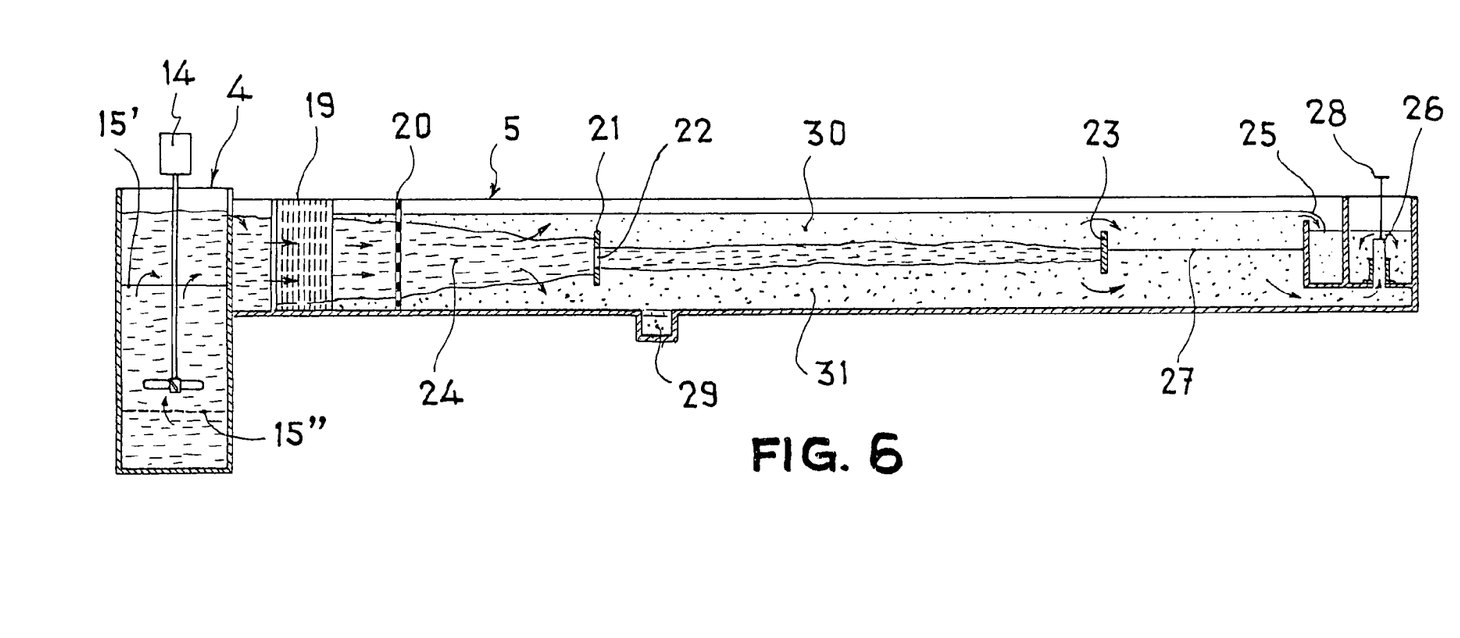
FIG. 6 shows a cross-section diagram of the mixer-settler from FIG. 2, with details of the evolution of the emulsion in the mixer and how it is affected by the different internal elements in the settler.

FIG. 6 shows how the emulsion (24) of the two phases flows from the last mixer (4) compartment and is finally fed into the settler (5). This emulsion (24), a mixture of the organic phase (30) and the aqueous phase (31), is subject to a conventional flow distributor (19) system and another with the same purpose, homogeneously distributed over the surface of the settler, and one or two flow buffers (20) which buffer the flow. The emulsion (24) behaves like a third phase with disappears over time inside the settler (5). Although for the decanted phases (30) and (31), a low unitary velocity is convenient, this is not the case for the emulsion (24), due to the convenience of generating the possibility of more contacts between the disperse droplets, leading to their coalescence and separation. This is achieved with the window (22) "tubing and compressing" this emulsion on the interface, and mitigating its increase in velocity with barriers lengthening or hindering their movement, such as the baffle without a window (23) which eliminates the prolongation of the emulsion in the vicinity of the collection channels (25) and (26). This minimises the final entrainments of one phase in the other and obtained a totally clear final phase (27). These two new additional elements, the baffle with a window (21) and, further downstream, the baffle without a window (23), both around 500 mm high, are installed cross-wise to the flow along the width of the settler, in the interface area and, as indicated by the evolution of the emulsion (24) in the interface, this improves phase separation and reduces entrainment. These new units consist of independent elements aligned or installed on posts or columns anchored in the settler in order to favour their installation and maintenance in large settlers. Several of these units can even be installed in parallel if required by the specific conditions of the installation. Their relative position can also vary according to the stage (mixer-settler) considered, to obtain maximum efficacy.

Figure 7:
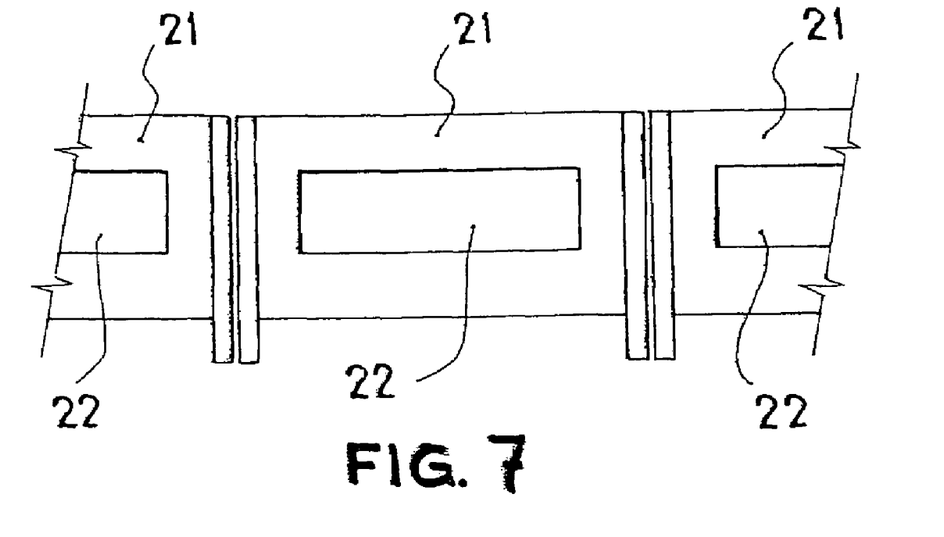
FIG. 7 shows a front view of the baffles with windows.
Figure 8:
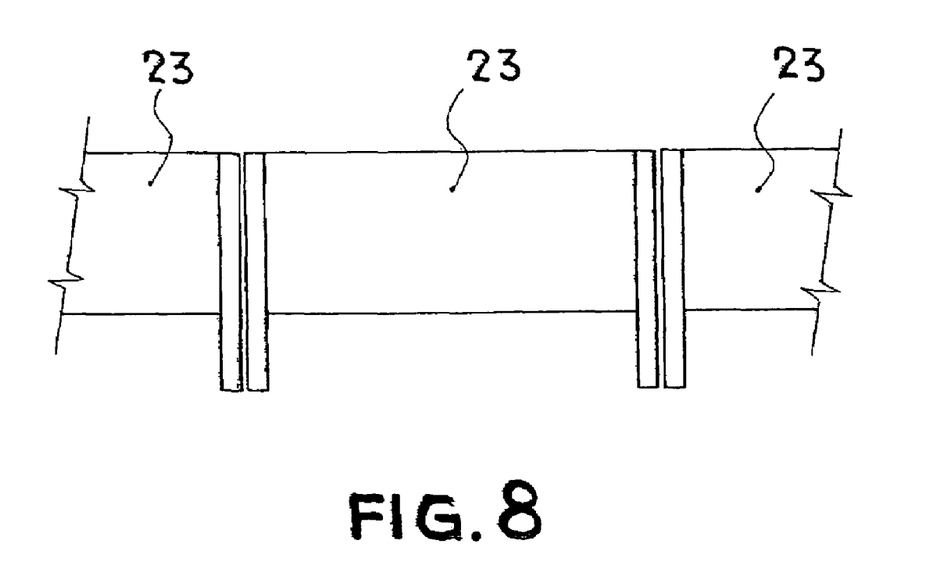
FIG. 8 shows a front view of the baffles without windows.

The baffles (21) and (23) made up of a series of modular units as shown in FIGS. 7 and 8, and supported from beneath, are positioned cross-wise to the flow, covering the entire width of the settler (5).

In a preferred embodiment, the agitator turbines have a diameter of between 0.2 and 0.7 of the circular diameter equivalent to the cross section (of the circle of the same cross section) of the mixer compartment, with the degree of agitation decreasing from 50 rps$^3$/sq.ft. to 0.5 rps$^3$/sq.ft. The height of the baffles is between 10% and 90% of the total height of the phases, and the opening of the baffles with windows is between 10% and 90% of their total surface area.

Finally, each stage of the same process (extraction (1), wash (2) or re-extraction (3)), and even each step within the same stage, can require different degrees of agitation of the above solutions, adapted to the concrete purpose in question, using, if necessary, several units in parallel, with these elements located at an appropriate height and distance in the settler (5), conveniently positioning the final interface (27) and applying the most appropriate operative conditions in each case. Each SX process, and each stage in particular, requires optimisation for its specific objectives.

EXAMPLES

A—Agitation

Several effects are analysed, with an example of the extraction of a metal ion in each. For each example, in each case tested, the metal was analysed in each phase, and the phase separation time until the dispersion band disappeared was determined, taking the mean value of at least five different and independent readings.

A1—Effect of the Type of Turbine with Blunt Blades

Comparison of the chemical extraction and eventual physical separation in a mixer with typical vertical blade turbines and with a blunt blade turbine, with other conditions remaining unaltered.

Example No 1

Mixer: 1 or 2 tandem compartments (one turbine in each, the first a pump turbine), cylindrical geometry with diameter=useful height (D=H), transparent, with upper baffle Typical turbines: (one for each compartment)
a) pump, 8 flat vertical blades, straight blades, diameter d=½ D of the compartment
b) pump, d=½ D, blunt blades and 8 straight flat vertical blades with curve r=0.1*e$^{(0.05x)}$ (where x is blade width and r the curve radius). (see FIG. 3)
c) 4 blades with 45° inclination, axial agitation, diameter d=⅓ D of the compartment (see FIG. 5)
d) 4 straight blades, radial agitation, diameter d=⅓ D of the compartment Reagents (feed):
Case A: Organic: D2EHPA (Di-2 ethyl hexyl phosphoric acid) 40% v/v in kerosene
Aqueous (impure solution feed): zinc sulphate solution with 32.7 g/L of Zn and pH=4.0
Case B: Organic: 5-nonyl-salicyl-aldoxime (Acorga M5640) 30% v/v in kerosene
Aqueous (impure solution feed): copper sulphate solution with 15.0 g/L of Cu and pH=1.5

Conditions: Temperature 30° C., total time of residence 3 min., organic/aqueous ratios 2 (organic continuous) or 1 (aqueous continuous).

Results: 1.1.—Case A reagents (Zinc):

| Type of agitation | Type of turbine | Degree of agitation N$^3$d$^2$ (rps$^3$ sq. ft.) | Zn g/L in phase Organic | Zn g/L in phase Aqueous | Table separation (sec.) |
|---|---|---|---|---|---|
| Aqueous continuous Org/Ac = 1 | a) | 19 | 11.0 | 19.0 | 78 |
| | b) | 19 | 11.1 | 18.9 | 69 |
| | a) + c) | 19(a) + 2.3 (c) | 11.1 | 19.0 | 82 |
| | b) + c) | 19 (b) + 2.3 (C) | 10.9 | 18.9 | 71 |
| | a) + d) | 19(a) + 2.3/d) | 11.0 | 19.1 | 84 |
| | b) + d) | 19(b) + 2.3(d) | 10.9 | 19.1 | 74 |
| Organic continuous Org/Ac = 2 | a) | 19 | 8.1 | 16.7 | 68 |
| | b) | 19 | 8.0 | 16.8 | 61 |
| | a) + c) | 19(a) + 2.3(c) | 8.0 | 16.7 | 69 |
| | b) + c) | 19(b) + 2.3(c) | 8.1 | 16.8 | 63 |
| | a) + d) | 19(a) + 2.3(d) | 8.0 | 16.7 | 75 |
| | b) + d) | 19(b) + 2.3(d) | 8.1 | 16.6 | 67 |

1.2.—Case B Reagents (Copper):

| Type of agitation | Type of turbine | Degree of agitation N$^3$d$^2$ (rps$^3$ sq. ft.) | Cu g/L in phase Organic | Cu g/L in phase Aqueous | Table separation (sec.) |
|---|---|---|---|---|---|
| Aqueous continuous Org/Ac = 1 | a) | 19 | 12.0 | 3.02 | 95 |
| | b) | 19 | 12.1 | 2.95 | 86 |
| | a) + c) | 19(a) + 2.3 (c) | 12.0 | 2.95 | 91 |
| | b) + c) | 19(b) + 2.3 (c) | 12.0 | 3.00 | 79 |
| | a) + d) | 19(a) + 2.3/d) | 11.9 | 3.08 | 94 |
| | b) + d) | 19(b) + 2.3(d) | 12.0 | 3.00 | 91 |
| Organic continuous Org/Ac = 2 | a) | 19 | 7.0 | 0.93 | 84 |
| | b) | 19 | 7.1 | 0.90 | 81 |
| | a) + c) | 19(a) + 2.3(c) | 7.0 | 0.95 | 82 |
| | b) + c) | 19(b) + 2.3(c) | 7.1 | 0.95 | 78 |
| | a) + d) | 19(a) + 2.3(d) | 7.1 | 0.93 | 83 |
| | b) + d) | 19(b) + 2.3(d) | 7.1 | 0.93 | 82 |

Conclusion: As we can see, irrespective of the metal extracted, the use of a pump turbine with blunt edges (b) hardly affects the chemical extraction process, but it always improves the velocity of liquid-liquid phase separation, both independently and in combination with other turbines. This effect is more marked in cases of aqueous continuous agitation.

A2.—Effect of the Decreasing Degree of Agitation

Comparison of the chemical extraction and eventual physical separation in a mixer with a series of compartments with the same degree of agitation or with decreasing agitation, with the other conditions remaining unaltered.

Example No 2

Mixer: 3 tandem compartments (one turbine in each, the first a pump turbine), cylindrical shape as in example No 1, transparent, with upper baffle Typical turbines: (one for each compartment)

b)—as in example No 1, pump, d=½ D, blunt blades and 8 straight, flat, vertical blades with curve $r=0.1*e^{(0.05x)}$ (where x is the blade width and r the curve radius)

c)—as in example No 1, axial agitation, diameter d=⅓ D of the mixer with 4 blades inclined 45° e)—plate, d=⅓ D, radial agitation, blunt blades and 6 flat, straight, vertical blades with curve $r=0.1*e^{(0.05x)}$ (where x is the blade width and r is the curve radius) (see FIG. 4)

Reagents:

Case E: Organic: D2EHPA (Di.2 ethyl hexyl phosphoric acid) 40% v/v in kerosene, loaded with 12.1 g/l of $Zn^{2+}$ and 0.3 g/l of $Fe^{3+}$, in equilibrium with Aqueous: zinc sulphate solution (20 g/l Zn, 18 g/l $H_2SO_4$)

Case B: Organic: Ald-oxy-oxime (Acorga M5640) 30% v/v in kerosene

Aqueous: copper sulphate solution with 15.0 g/l of Cu and pH=1.5

Conditions: Temperature 30° C., total residence time 3 min., organic/aqueous rations 2 (organic continuous) or 1 (aqueous continuous), recycling the corresponding phase in equilibrium, when necessary.

Results: 2.1.—Case A reagents (Zinc)

| Type of agitation | Type of turbine | Degree of agitation $N^3d^2$ ($rps^3$ sq. ft.) | Zn g/L in phase Organic | Zn g/L in phase Aqueous | Table separation (sec.) |
|---|---|---|---|---|---|
| Aqueous continuous Org/Ac = 1 | b) + c) + c) | 19(b) + 12(c) + 8(c) | 11.0 | 19.1 | 68 |
|  | b) + c) + c) | 19(b) + 8(c) + 8(c) | 11.0 | 19.0 | 60 |
|  | b) + c) + c) | 19(b) + 8(c) + 2.3(c) | 11.1 | 18.9 | 53 |
| Organic continuous Org/Ac = 2 | b) + c) + c) | 19(b) + 12(c) + 8(c) | 8.1 | 16.7 | 79 |
|  | b) + c) + c) | 19(b) + 8(c) + 8(c) | 8.0 | 16.8 | 71 |
|  | b) + c) + c) | 19(b) + 8(c) + 2.3(c) | 8.1 | 16.8 | 62 |

2.2.—Case B Reagents (Copper)

| Type of agitation | Type of turbine | Degree of agitation $N^3d^2$ ($rps^3$ sq. ft.) | Cu g/L in phase Organic | Cu g/L in phase Aqueous | Table separation (sec.) |
|---|---|---|---|---|---|
| Aqueous continuous Org/Ac = 1 | b) + c) + c) | 19(b) + 8(c) + 8(c) | 12.0 | 3.02 | 79 |
|  | b) + c) + c) | 19/b) + 8(c) + 2.3(c) | 12.1 | 2.95 | 73 |
|  | b) + e) + c) | 19(b) + 8(e) + 8(c) | 12.0 | 2.95 | 81 |
|  | b) + e) + c) | 19(b) + 8(e) + 2.3(c) | 12.0 | 3.00 | 77 |
| Organic continuous Org/Ac = 2 | b) + c) + c) | 19(b) + 8(c) + 8(c) | 7.0 | 0.93 | 76 |
|  | b) + c) + c) | 19/b) + 8(c) + 2.3(c) | 7.1 | 0.90 | 73 |
|  | b) + e) + c) | 19(b) + 8(e) + 8(c) | 7.0 | 0.95 | 77 |
|  | b) + e) + c) | 19(b) + 8(e) + 2.3(c) | 7.0 | 0.98 | 75 |

Conclusion: A decreasing sequence in the degree of agitation through the series of mixing compartments improves the liquid-liquid phase separation velocity in solvent extraction.

B.—Settling

In a prototype mixer-settler, we analyse the effect of internal elements on settling, with an example in each. For each example, in each case tested, the organic phase entrainments in the aqueous phase, and vice versa, were analysed at the end of the settling process, determining the height of the dispersion band or the distance at which it disappeared, taking the mean value of five different and independent readings.

B1.—Effect of the Baffle with Window in the Settler, with the Same Type of Mix

Comparison of the emulsion consistency and entrainment of aqueous phase in organic phase and organic phase in aqueous phase, in a prototype settler, with and without a baffle with a window.

Example No 3

Typical Mixer/Agitation:

Mixer with a series of three identical FGRP parallelopipedic 350 L compartments, communicated by channels consisting of independent double overflow-bottom walls, with the following characteristics:

Parallelopipedic, square based, side=0.89 of height H, transparent

Agitation in aqueous continuous and organic/aqueous ratio=1 in all mixers

Conditions: 30° C., total residence time 3 min., organic/aqueous ratio=1

Turbine:

$1^{st}$ compartment: case b) from example No 1, agitation with $N^3d^2$=19 ($rps^3$sq.ft.)

$2^{nd}$ and $3^{rd}$ compartment: case c) from example No 1, agitation $N^3d^2$=8 ($rps^3$sq.ft.)

Reagents: Case E: organic: D2EHPA (Di-2 ethyl hexyl phosphoric acid) 40% v/v in kerosene, loaded with 12.1 g/l of $Zn^{2+}$ and 0.3 g/l of $Fe^{3+}$ in equilibrium with Aqueous: zinc sulphate solution (20 g/l Zn, 18 g/l $H_2SO_4$)

Continuous operation in industrial prototype mixer-settler. Centralised control

Typical settler:

Of transparent methacrylate, 22×0.25×1.1 m (L×W×H) (length×width×height). Internal elements positioned perpendicularly to the direction of the flow: distributor, laminator-buffer and, when indicated, 1 0.5 m high baffle with central 0.25 m window, centred on the axis of the interface and positioned at a distance (variable) from the mixer outlet.

The specific flow of each phase was 2.5 $m^3/hm^2$. The unitary velocity values were 2.5 m/min in organic and 1.8 m/min in aqueous.

Results:

|  | Position and/or | Dispersion band (m) | | | Entrainment (ppt) of | |
| --- | --- | --- | --- | --- | --- | --- |
| Baffle with window | dimension, m | Height before | Height afterwards | At final overflow | Organic in aqueous | Aqueous in organic |
| No | 5 | 0.29 | | 0.18 | 27 | 191 |
|  | 10 | 0.26 | | | | |
|  | 15 | 0.22 | | | | |
| Yes | 5 | 0.36 | 0.26 | 0.12 | 21 | 129 |
|  | 10 | 0.26 | 0.23 | 0.11 | 20 | 130 |
|  | 15 | 0.22 | 0.22 | 0.12 | 24 | 158 |

Conclusion: In the conditions tested, the presence of a baffle with a window improves the efficacy of the liquid-liquid decantation process, considerably decreasing the entrainments of one phase in the other. This improvement is more effective the greater the dispersion band on which it is applied (less advanced position in the direction of the flow), without overflowing above and/or beneath the baffle.

B2.—Effect of the Baffle Without a Window in the Settler, with the Same Type of Mix Comparison of the consistency of the emulsion and entrainment of aqueous phase in organic phase and vice versa, in a prototype settler, with and without a baffle without a window.

Example No 4

Reagents, Operation, Mixer, Agitation and Conditions: as in the Previous Example Type of settler: as in the previous example (No 3) Internal elements located perpendicularly to the direction of the flow: distributor, laminator-buffer and, when indicated, a 0.5 high baffle without a window, centred on the axis of the interface and located at a distance (variable) from the mixer outlet. Unitary velocities and specific flows: as in example No 3

Results:

|  | Position and/or | Dispersion band (m) | | | Entrainment (ppt) of | |
| --- | --- | --- | --- | --- | --- | --- |
| Baffle without window | dimension, m | Height before | Height afterwards | At final overflow | Organic in aqueous | Aqueous in organic |
| No | 10 | 0.27 | | Note (*) | 30 | 207 |
|  | 13 | 0.25 | | | | |
|  | 16 | 0.22 | | | | |
| Yes | 10 | 0.50 | 0.05 | 15 | 24 | 142 |
|  | 13 | 0.39 | 0.00 | 13 | 18 | 130 |
|  | 16 | 0.22 | 0.00 | 16 | 20 | 125 |

Note
(*): At the end of the settler the dispersion band was still 0.19 m

Conclusion: In the conditions tested, the presence of a baffle without a window improves the efficacy of the liquid-liquid phase decantation process, considerably decreasing the entrainments of one phase in the other. This improvement is more effective the smaller the dispersion band on which it is applied (more advanced position in the direction of the flow), providing it does not overflow above and/or beneath the baffle.

C.—Mixing and Settling

Combined effect of special turbines, decreasing degree of agitation and the two baffles (with and without a window), on decantation speed and entrainments of one phase in the other C1.—Synergic Effect of All the New Devices and Methods Comparison between the application or not of the new inventions introduced (blunt edged turbine, decreasing degree of agitation, baffle with window and baffle without window) and their synergic effect, and their behaviour in the different stages of the SX installation.

Example No 5

Reagents:

Case E (extraction): see previous examples No 3 and No 4

Case W (wash): organic: D2EHPA (Di-2 ethyl hexyl phosphoric acid) 40% v/v in kerosene, loaded with 12.1 g/l of $Zn^{2+}$ and 0.3 g/l of $Fe^{3+}$.

Aqueous: zinc sulphate solution (27 g/l Zn, 17 g/l $H_2SO_4$)

Case R (re-extraction): organic: D2EHPA (Di-2 ethyl hexyl phosphoric acid) 40% v/v in kerosene, loaded with 1.5 g/l of $Zn^{2+}$ and 0.3 g/l of $Fe^{3+}$ Aqueous: zinc sulphate solution (85 g/l Zn, 17 g/l $H_2SO_4$)

Continuous operation, in industrial prototype mixer-settler. Centralised control Type of mixer-settler:

Mixer: three compartments as in examples No 3 and No 4

Agitation: Cases E and W: aqueous continuous organ/ac ratio=1 in the three compartments. Case R: organic continuous organ/ac-ratio=3 in both mixers Conditions: 30° C., total residence time 3 min.

Turbines:

Test without application of the invention:

$1^r$ compartment: type a) from example No 1, agitation $N^3d^2=19$ ($rps^3$sq.ft.)

$2^{nd}$ and $3^{rd}$ compartments: type c) from example No 1, agitation $N^3d^2=8$ ($rps^3$sq.ft.)

Test with application of the invention:
- $1^{st}$ compartment: type b) from example No 1, agitation $N^3d^2=19$ (rps$^3$sq.ft.)
- $2^{nd}$ compartment: type c) from example No 1, agitation $N^3d^2=8$ (rps$^3$sq.ft.)
- $3^{rd}$ compartment: type c) from example No 1, agitation $N^3d^2=2.3$ (rps$^3$sq.ft.)

In this case, as can be seen, all the turbines have blunt blades and there is a decreasing distribution of the degree of agitation throughout the series of compartments.

Type of settler: as in examples No 3 and No 4

Internal elements: in all cases, at least distributor and laminator-buffer, and in the tests applying the invention, a baffle with a window (BV) as indicated in example No 3, located in all cases at 6 m and a baffle without a window (BC), as indicated in example No 4, located at 15 m in cases E and W, or at 11 m in case R, all measured from the mixer outlet.

The specific flows and unitary velocities used for each phase were:

|  | Flow (m$^3$/hm$^2$) | | Velocity (m/min) | |
|---|---|---|---|---|
| Case | Organic | Aqueous | Organic | Aqueous |
| E and W | 2.5 | 2.5 | 2.5 | 1.8 |
| R | 4.1 | 1.3 | 4.2 | 0.9 |

Results: we compare the three stages: extraction (e), wash (W) and re-extraction (R) in their behaviour with and without the indicated inventions. In all the cases where the invention was applied, there was no final dispersion band after the BC.

| Baffles | Reagents case | Dispersion band height (m) Before BV | After BV | Before BC | Entrainment (ppt) of Organic in aqueous | Aqueous in organic |
|---|---|---|---|---|---|---|
| No | E | 0.29 (*) |  | 0.23 (*) | 28 | 196 |
|  | W | 0.31 (*) |  | 0.22 (*) | 26 | 202 |
|  | R | 0.18 (*) |  | 0.09 (*) | 7 | 505 |
| Yes | E | 0.30 | 0.20 | 0.19 | 18 | 119 |
|  | W | 0.29 | 0.20 | 0.20 | 17 | 125 |
|  | R | 0.27 | 0.19 | 0.18 | 5 | 456 |

(*) Measured at the same distance at which the baffles would be located, although they are not used here.

Conclusions: In the conditions tested, where the inventions in question are used (type of turbines and decreasing degree of agitation, together with the presence of a baffle with a window and a baffle without a window), it has been seen that in all cases, within each stage, there is a clear improvement in the efficacy of the liquid/liquid decantation process and, surprisingly, an evident and clear synergic effect, with the final dispersion band decreasing considerably, together with the entrainments of one phase in the other (compare case E with similar cases in examples No 4 and No 5).

Their concrete application both in agitation methods and as internal parts in the respective settlers, can vary according to the behaviour of each step, depending on the mixing and decantation characteristics required, such as the height and consistency of the emulsion band generated.

This improvement is general for each and every one of the typical stages of a solvent extraction process and, in relative terms with regards to its absence, more effective the more difficult is the natural decantation of the system on which it is applied.

The invention claimed is:

1. A mixing and settling device for solvent extraction processes to recover high purity products from a fluid comprising a mixer divided into compartments connected to a settler including a first compartment, a last compartment and a series of following compartments between the first and last compartments the first compartment of the mixer is provided with a primary agitator that includes a blunt edged agitation-pump turbine, and the following compartments are provided with secondary blunt edged agitation turbines, each compartment is connected by a communication channel transferring the fluid over an upper overflow located on an output side of a previous compartment and beneath a lower overflow located on an input side of a subsequent compartment, and the last compartment of the mixer is flow connected to a settler, the settler contains at least one baffle with a window, located in a liquid-liquid interface area of the settler and perpendicularly to flow of the fluid and positioned after at least one flow buffer, and at least one baffle without window located in a liquid-liquid interface area of the settler after the baffle with a window, and perpendicularly to the flow of the fluid.

2. The device according to claim 1, wherein the blunt edges of the turbines preferably correspond to function $r=0.1*e^{(0.05x)}$, where x is the blade width and r is the curve radius applied.

3. The device according to claim 1, wherein the decreasing degree of agitation varies from a maximum of 50 rps$^3$sq.ft to a minimum of 0.5 rps$^3$sq.ft.

4. The device according to claim 1, wherein the baffle with window is positioned before a final collection channel and the baffle without window is positioned after the flow buffer.

5. The device according to claim 1, wherein the window of the baffle with window has an area covering between 10% and 90% of a surface area of the baffle with window.

6. The device according to claim 1, wherein the height of the baffle is from 10% to 90% of the total height of the settler.

7. A mixing and settling method in solvent extraction processes with two phases for the recovery of high-purity products, comprising providing the device of claim 1 and comprising the following steps;

mixing the phases gentle so as to inhibit secondary dispersion of small droplets, obtaining an emulsion, and retaining the emulsion to slow the emulsion, also allowing for the upper and lower overflow respectively of upper and lower non-emulsified phases, that are respectively less heavy and heavier.

8. The mixing and settling method according to claim 7 characterized in that the agitation-pump turbine and the agitation turbines have a circular diameter between 0.2 and 0.7, of a circular diameter equivalent to the cross section of a respective compartment with a number of blades between 2 and 12.

9. The mixing and settling method according to claim 7 wherein the blunt edges of the turbines correspond to function $r=0.1*e^{(0.05x)}$, being x the blade width and r the applied curve radius.

10. The mixing and settling method according to claim 7 wherein the decreasing degree of agitation varies from a maximum of 50 rps³sq.ft to a minimum of 0.5 rps³sq.ft.

11. The mixing and settling method according to claim 7 wherein the baffle with window is positioned before the final collection channels and the baffle without window is positioned after the flow buffer.

12. The mixing and settling method according to claim 7 wherein the baffle with window has a window covering between 10% and 90% of a surface area of the window.

13. The mixing and settling method according to claim 7 wherein the height of the baffle is from 10% to 90% of the total height of the settler.

14. The device according to claim 1, characterized in that the agitation-pump turbine and the agitation turbines have a circular diameter between 0.2 and 0.7 of a circular diameter equivalent to the cross-section of a respective compartment, with a number of blades between 2 and 12.

15. The device according to claim 1 wherein the agitation turbines are radial turbines.

16. The device according to claim 1 wherein the agitation turbines are axial turbines.

17. The device according to claim 1 wherein the agitation turbines include both axial and radial turbines.

* * * * *